United States Patent

Bouron et al.

[11] 4,376,451
[45] Mar. 15, 1983

[54] CONTAINER

[75] Inventors: Pierre Bouron, Amboise; Maurice Robineau, St-Pierre des Corps; Alain Thiery, Neuilly sur Seine, all of France

[73] Assignee: Societe Metallurgique Liotard Freres, Paris, France

[21] Appl. No.: 246,181

[22] Filed: Mar. 23, 1981

[51] Int. Cl.³ .................... F16K 24/00; F17C 13/06
[52] U.S. Cl. ................................. 137/588; 137/590; 220/366; 220/374
[58] Field of Search ............. 137/587, 588, 590, 320; 220/366, 367, 374

[56] References Cited

U.S. PATENT DOCUMENTS

| 245,349 | 8/1881 | Coester | 137/588 |
| 350,157 | 10/1886 | Rothrock | 137/587 |
| 913,949 | 3/1909 | Gold | 137/588 |
| 2,358,666 | 9/1944 | Spayd | 137/320 |
| 3,435,846 | 4/1969 | Horton et al. | 137/590 |
| 3,459,220 | 8/1969 | Morse | 137/588 |

Primary Examiner—Alan Cohan
Assistant Examiner—John A. Rivell
Attorney, Agent, or Firm—Sixbey, Friedman & Leedom

[57] ABSTRACT

This container for fluid under pressure comprises a receiver provided with an opening, defined by a seating closed by a closure member. The seating is penetrated by an angled bore which issues from the interior face of the seating opposite a passage disposed in the closure member. It may be used in petrochemical industry.

5 Claims, 4 Drawing Figures

CONTAINER

The present invention relates to containers and more particularly those intended to contain a fluid under pressure.

These containers comprise a receiver, of a pressure-resistant material, provided with a manhole or an opening. This opening is closeable by a member which seals around the edges of the opening through the intermediary of a collar or a seating formed adjacent these edges. Often this closure member performs diverse functions, for example the passage of a conduit or the supporting of a control device, for example of the fluid level within the container or operating means, particularly for the supply or the discharge of fluid contained in the receiver. The realisation of these diverse functions adversely affects the integrity of the closure member in different ways. As a single container must be suitable for diverse uses, it is necessary to provide a closure member which has often greater strength than is necessary since the aforementioned functions affect differently the strength of the closure member. Besides, it may happen that the closure member may be too small to effect all the various functions. Finally, assembly of the necessary elements for two different functions can prove impossible other than by assembling them first then subsequently placing the receiver around them, which greatly complicates the operations and prevents a subsequent replacement of the closure member or increases the costs considerably.

The invention remedies all these inconveniences by a container comprising a receiver, of a pressure-resistant material, provided with an opening, defined by a seating and closeable by a closure member, and a conduit opening into the receiver, characterised in that the conduit is formed by a bore in the seating and by a passage which is disposed in the closure member and which is aligned with the bore. Preferably the bore and the passage abut each other.

There is thus disposed a conduit opening into the receiver, which is independent of the closure member, the latter remaining available for other functions.

Sometimes the receiver must be placed in a confined space. If the opening were to be provided at the top, it would not be very accessible. If it is disposed on the side, its axis makes an angle with the vertical of at least 25°. In order to be able to sample in the best way, separately, the liquid phase and the vapour phase of the receiver, it is convenient to extend the bore by an angled tube into the interior of the receiver in the direction of the top thereof. All penetration of the liquid phase into the tube is excluded since the mouth of the tube is facing the top. Another conduit extends through the closure member and, in order to open into the lower part of the container, it is also angled but in a different direction, for example, opposed to that of the tube. Although the distance separating the ends of the tube and the conduit greatly exceeds the largest dimension of the opening, their mounting is simplified since they are connected respectively the one to the seating and the other to the closure member and not to a single one of the latter.

In the annexed drawings, given solely by way of example:

Figure 1:
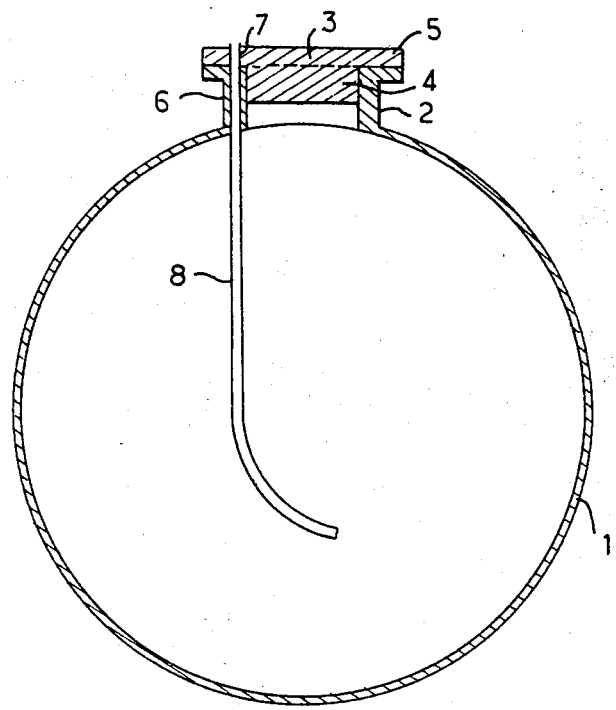
FIG. 1 is a sectional view of a container in accordance with the invention.

The container of FIG. 1 comprises a cylindrical receiver 1 of pressure-resistant steel, provided, at its top, with a collar or seating 2 defining an opening. This circular opening is closed by a closure member 3 having a main portion 4 engaged in the opening and a flange 5 of which the lower face is in contact with the upper face of the collar and is maintained there by a fixing device (not shown).

In the collar there is provided a bore 6 extending from the upper face to that face directed towards the interior of the receiver 1. A passage 7 also extends right through the flange 5 of the closure member 3 in register with the bore 6. The passage 7 and the bore 6 abut each other and have the same diameter. An angled tube 8 extends the bore 6 into the interior of the receiver 1.

Figure 2:
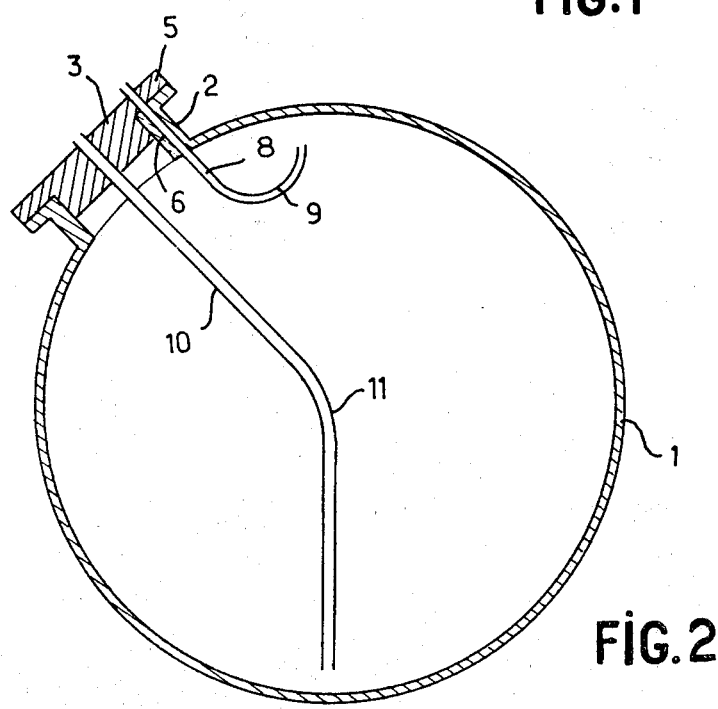
FIGS. 2 and 4 are sectional views of a modification.
Figure 4:
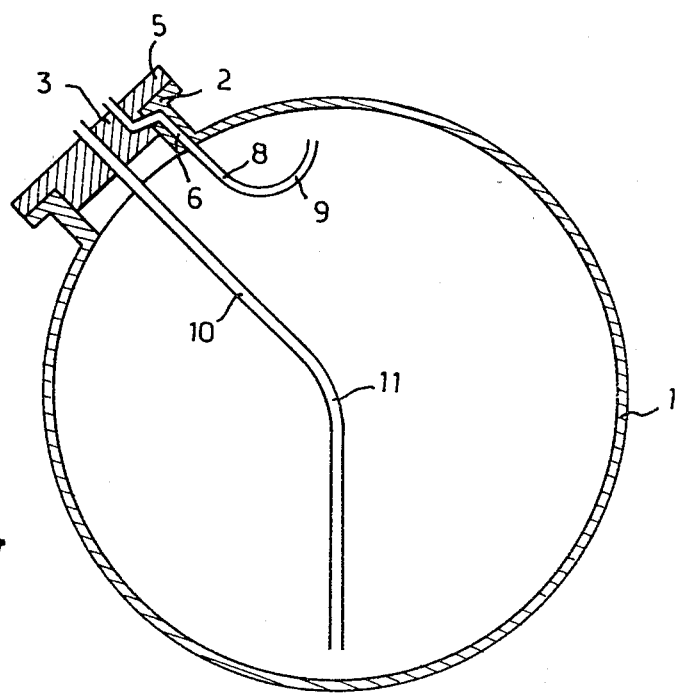

In FIGS. 2 and 4, the axis of the circular opening is inclined in relation to the vertical. The tube 8 is angled at 9 so as to discharge towards the top of the receiver 1 and opposite said top.

A conduit 10 extending through the closure member 3 and discharging into the receiver 1 is angled at 11 within the interior of the receiver 1 so as to discharge at the bottom of the receiver. The distance separating the mouths of the tube 8 and the conduit 10 is much greater than the diameter of the opening. The introduction of the tube 8 and the conduit 10 into the receiver is effected however without the least difficulty.

Figure 3:
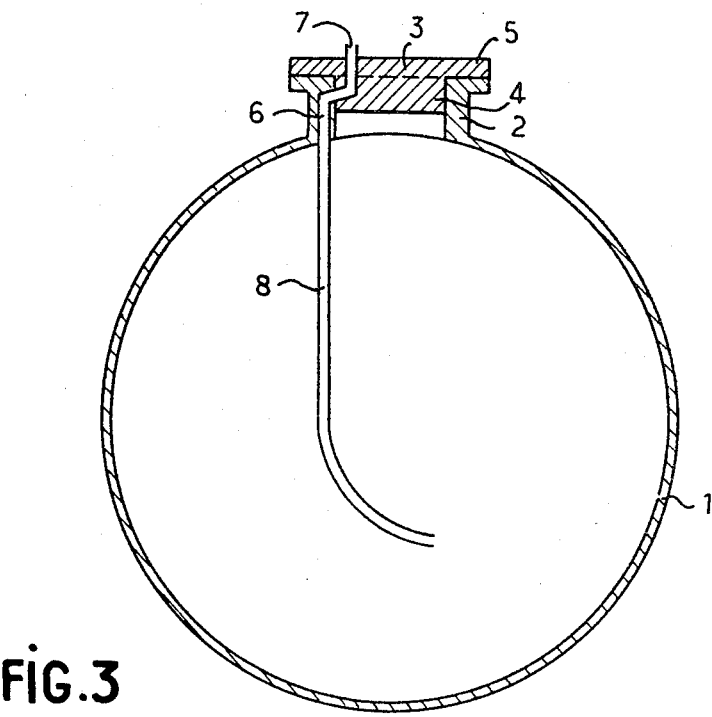
FIG. 3 is a sectional view of another modification.

In FIG. 3 a bore 6 in the form of an angle is provided in the collar extending from the side interior face to that face directed towards the interior of the receiver 1. An angled passage 7 extends also through the portion 4 of the closure member 3 and its lower extremity is located opposite the bore 6. This passage 7 and the bore 6 abut each other. A bent tube 8 extends the bore 6 into the interior of the receiver 1.

One can therefore cause the passage to open further towards the centre of the closure member and consequently reduce the diameters of the closure member and the seating.

We claim:

1. Container comprising a receiver of a pressure-resistant material and provided with seating which has an inner sideface and which defines an opening, a closure member which closes the opening, a passage disposed in the closure member, a bore disposed in the seating, one end of the bore opening into the receiver and the other end of the bore issuing from the inner side face of the seating and the passage abutting against said latter end, the bore being extended into the interior of the receiver by a tube which is angled in the direction of the top of the receiver, and a conduit extending through the closure member but not through the seating, opening into the receiver and which is angled in the interior of the receiver in a direction different to that according to which the tube is angled.

2. Container according to claim 1 in which the conduit is angled in a direction opposed to that in which the tube is angled.

3. Container according to claim 1 in which the receiver has only a single opening.

4. Container according to claim 1 in which the bore is angled.

5. Container according to claim 1 in which the passage is angled.

* * * * *